US005463264A

United States Patent [19]

Koenitzer

[11] Patent Number: 5,463,264

[45] Date of Patent: Oct. 31, 1995

[54] CONSTANT FORCE BRUSH HOLDER ASSEMBLY

[75] Inventor: Jeff D. Koenitzer, Brookfield, Wis.

[73] Assignee: Helwig Carbon Products, Inc., Milwaukee, Wis.

[21] Appl. No.: 277,036

[22] Filed: Jul. 19, 1994

[51] Int. Cl.[6] .......... H02K 13/00

[52] U.S. Cl. .......... 310/242; 310/245; 310/249

[58] Field of Search .......... 310/239, 241, 310/242, 245, 246, 247, 233, 89, 248, 249, 71

[56] References Cited

U.S. PATENT DOCUMENTS

| | | | |
|---|---|---|---|
| 2,695,968 | 11/1954 | Welch et al. | 310/239 UX |
| 3,376,444 | 4/1968 | Eaton, Jr. et al. | 310/249 |
| 3,387,156 | 6/1968 | Elew et al. | 310/247 |
| 3,430,084 | 2/1969 | Hall et al. | 310/242 |
| 3,430,915 | 3/1969 | Vogelsberg | 310/245 |
| 4,375,040 | 5/1983 | Sauerwein | 310/239 |
| 4,389,588 | 6/1983 | Rankin | 310/242 |
| 4,800,313 | 1/1989 | Warner et al. | 310/242 |
| 4,990,811 | 5/1991 | Nakata et al. | 310/239 |
| 5,059,846 | 10/1991 | Concannon | 310/239 |

*Primary Examiner*—R. Skudy
*Attorney, Agent, or Firm*—Robert B. Benson

[57] ABSTRACT

A brush holder assembly for an electric machine such as a motor that utilizes a constant force spring positioned within a U-shaped retainer to apply a constant force on a brush positioned against the spring within the retainer. The brush, spring and retainer are positioned within a container mounted on the housing of the electric machine. A removable cap is mounted in the radially outer end of the container to maintain the brush and spring in proper position during operation and allow easy removal and replacement of the brush when needed.

5 Claims, 2 Drawing Sheets

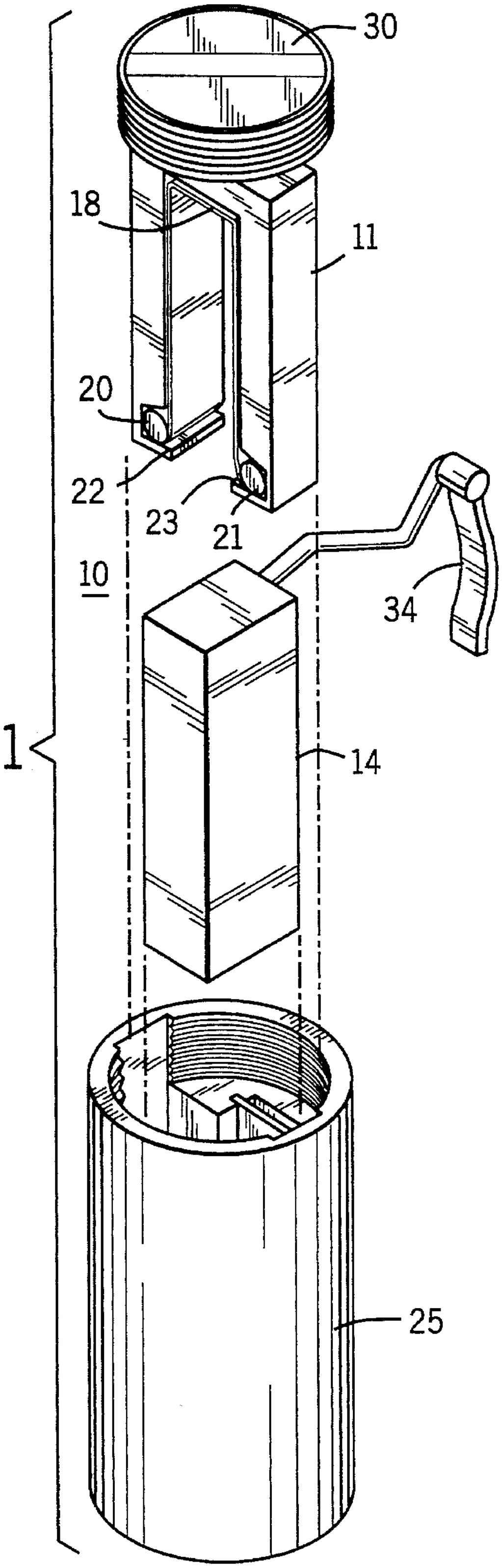
FIG. 1
FIG. 3
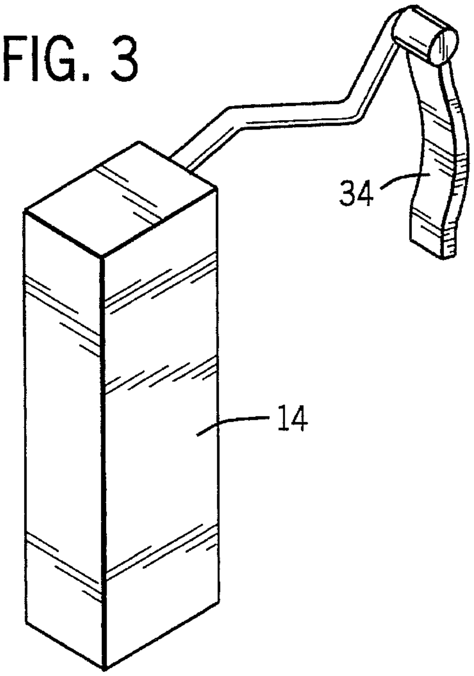
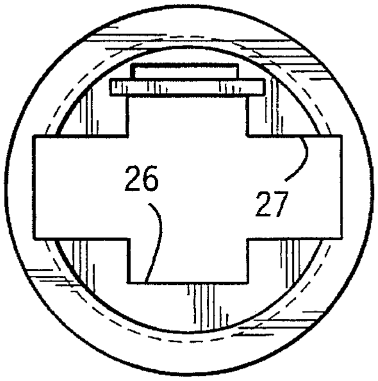
FIG. 2

CONSTANT FORCE BRUSH HOLDER ASSEMBLY

FIELD OF THE INVENTION

This invention relates to a brush holder assembly for electric machines; such as, electric motors and generators or other electrical apparatus requiring current to a moving surface.

BACKGROUND OF THE INVENTION

The useful life of A.C. series universal motors and small D.C. motors that typically find application in appliances., tools and the like, as well as in many industrial contexts, is usually limited to the length of the carbon brush, its rate of wear, and—in the case of replaceable brushes—the number of times the brushes can be replaced before the commutator begins to wear severely.

It is understood that the rate or wear of the brush is a function of the load, the speed of the motor, and most importantly, the spring pressure that is applied to the brush to keep it, in bearing contact with the commutator. The curve of brush wear plotted against spring pressure, however, forms a parabola. Accordingly, it will be appreciated that with too much spring pressure the mechanical wear will become excessive, an improper film is formed on the commutator, and the brush life falls markedly. On the other hand, with too little pressure applied, the electrical arcing due to the high contact resistance and the loss of electrical contact greatly reduce the possible life of the brush and the contact surface.

The typical motor assembly rigging involves a helical spring bearing on the carbon brush, the two elements being combined in a box-like holder such that the brush is urged against the commutator. Although this design is used universally, it has several limitations.

The pressure produced by a helical spring is a function of its compression or extension. Therefore, when the brush assembly is brand new, and the brushes are at maximum length, the spring is at its fullest compression and the pressure therefore at its highest; at the end of the brush life, the spring extension is at its greatest and the pressure now typically is below the ideal. Therefore, depending on the spring rate, only a portion of the brush wear is in the ideal spring pressure range.

In addition To the force deflection curve, the helical spring also has a finite collapsed length. Accordingly, since the spring is generally located behind the brush in accordance with the usual way of enclosing it in the brush box, the space that it requires dictates that a shorter brush be used.

A long-life brush design using a constant force spring that is essentially wound like a clock spring and is set to unwind in such a direction as to hold the brush against the commutator has been used to overcome some of the problems mentioned above with the helical springs. By using a constant force spring, the ideal pressure range on the brush can be obtained, thereby obtaining minimum wear on the brush from this aspect.

It has been known to utilize an electrically conductive helical coil spring to provide electrical connection between the one end of a brush and a source of electricity. An example of such a device may be found in U. S. Pat. No, 3,376,444. An example of a brush holder utilizing a constant force spring through which current is flowed to the outer end of the brush may be found in U.S. Pat. No. 3,387,156 with particular reference being made to the embodiment illustrated in FIG. 6 thereof. An example of a brush assembly utilizing a constant force twin coil spring may be found in U.S. Pat. No. 2,695,968, and particularly the embodiment illustrated in FIG. 6 thereof.

The problems encountered with the constant force springs for brush holder assemblies include the difficulty in holding the brush and spring in place and the difficulty in replacing the brush when it is worn.

OBJECTS OF THE INVENTION

With the foregoing in mind, a primary object of the present invention is to provide a brush holder assembly which overcomes the limitations of prior art brush holder assemblies.

Another object of the present invention is to provide a novel brush holder assembly which operates to improve the service life of brushes used therein.

A further object of the present invention is to provide an improved brush holder assembly having a constant force spring system which is easily removable from the motor so the brushes may be replaced without disrupting other parts of the electric machine.

SUMMARY OF THE INVENTION

More specifically, the present invention provides a brush holder assembly comprising a U-shaped retainer having a cavity adapted to slidably receive a brush. A twin coil constant force spring is mounted in the legs of the retainer with its central portion engaging the outer end of a brush, to urge the brush into constant contact with the rotor of an electric machine.

BRIEF DESCRIPTION OF THE DRAWINGS

The foregoing and other objects, features and advantages of the present invention should become apparent from the following descriptions when taken in conjunction with the accompanying drawings, in which:

FIG. 1 is an exploded perspective view of the improved brush holder assembly which embodies the present invention;

FIG. 2 is a top view of the container of FIG. 1;

FIG. 3 is a view illustrating a typical carbon brush to be used in the assembly;

DESCRIPTION OF THE PREFERRED EMBODIMENT

Figure 4:
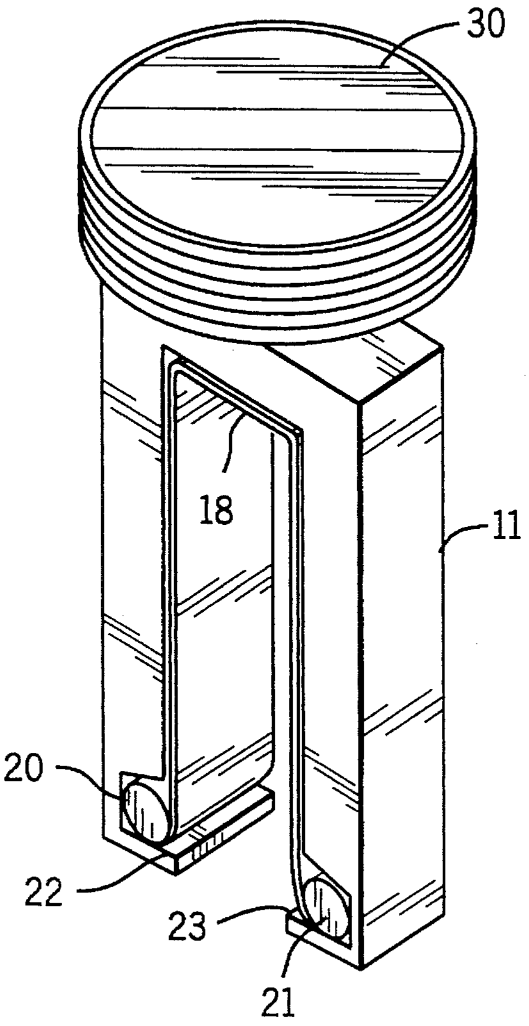
FIG. 4 is a showing of the brush retainer with a constant force spring in tensioned position.
Figure 5:
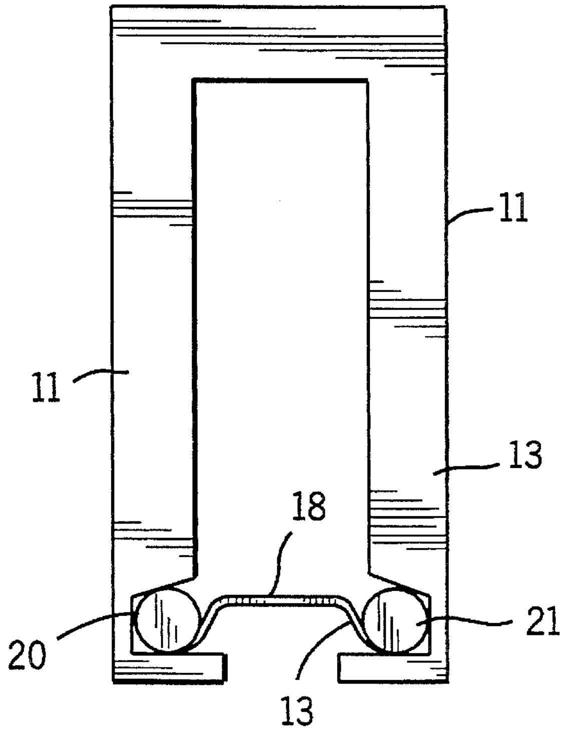
FIG. 5 is a showing of the spring in the retainer in its relaxed position.
Figure 6:
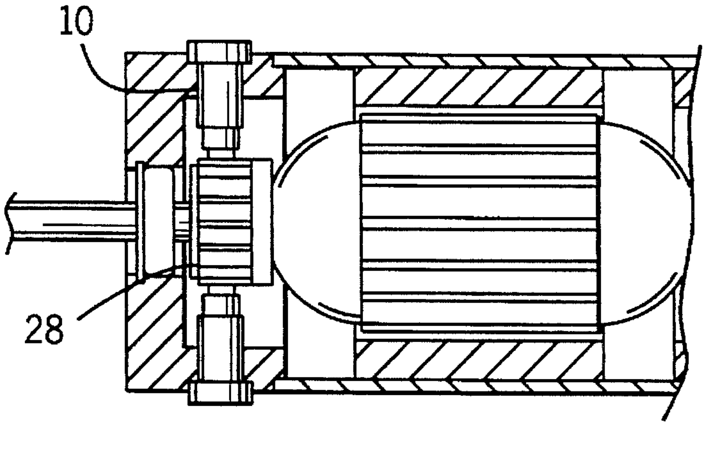
FIG. 6 is a cross section view through an electric motor using the brush holder assembly of this invention.

Referring now to the drawings, FIG. 1 illustrates a brush assembly 10 which embodies the present invention. The brush assembly 10 is particularly suited for use in supplying power to the commutator of an electric motor, such as a small electric motor as may be found in a variety of applications, including vacuum cleaners, portable tools, etc. The invention is being described in connection with an A.C. electric motor but is also usable with other dynamo electric machines such as small D.C. motors. In the illustrated embodiment, the motor housing is provided with a base for mounting the brush assembly. Another like brush assembly is similarly mounted on the diametrically opposite side of the rotor in the motor housing.

The brush assembly of this invention 10 comprises a U-shaped brush retainer 11 having a cavity between the legs 13 of the retainer 11 for slidably receiving a brush 14 for radial movement with respect to the rotor of an electric motor. The brush retainer 11 is preferably fabricated of nonconducting material such as plastic. A twin coil spring 17 preferably of stainless steel is mounted in the retainer 11 and has a middle portion 18 engaging the outer end of the brush 14. The ends of the spring terminate in a pair of coils 20 and 21 disposed in the recesses 22 and 23 respectively in the legs of the retainer. Preferably, the coils of the spring in the relaxed position are spread apart at a distance wider than the space between the legs of the retainer 11. In this way the twin coil spring 17 exerts an outward pressure against the retainer 11 to help to keep the spring positioned within the retainer when it is removed from its holder.

There are many ways in which the brush holder assembly can be mounted on the housing of an electric machine. One such mounting arrangement is illustrated in FIG. 1. As seen therein, a cylindrical container 25 has a pair of longitudinally extending slots 27 for receiving the retainer 11 and the brush 14. The slots are located to position the brush in the proper position relative to the commutator 28 of the electric motor. As shown the slots are spaced 180° apart.

The container 25 is closed at its radially outer end by a suitable removable cap 30 so that when the cap is removed the retainer, brush and spring may be removed without disrupting any other portion of the machine.

When the cap 30 is in place, the twin coil spring functions to apply a substantially constant radially inward force on the brush 14, thereby causing the brush 14 to engage the periphery of the commutator 28 with a substantially constant pressure irrespective of the position of the brush 14 in its retainer. Hence, the biasing force remains Substantially constant throughout the life of the brush, being unaffected by changes in brush length due to wear.

A shunt has one end affixed to the outer end of the brush 14 and its other end has a terminal 34 which fits into a brass conductor formed in a slot 26 the upper end of the container 25.

From the foregoing description of the invention, it has been shown how the objects of the invention have been obtained in a preferred manner. However, modifications and equivalents of the disclosed concepts such as readily occurred to those skilled in the art are intended to be included within the scope of this invention.

Having particularly described and ascertained the nature of my invention and the manner in which it is to perform, what I claim is:

1. A brush holder assembly for use with a dynamo electric machine comprising:

a cylindrical container mounted in a housing of said machine and having an opening extending radially inward toward a commutator of said machine;

a U-shaped retainer slidably positioned within said container with legs of said U-shaped retainer extending radially inward towards the commutator of said machine;

inner sides of each of said legs having a recess near ends of said legs;

a brush positioned between said legs of said retainer;

a constant force spring positioned between said brush and on inner surface of said retainer;

said spring having a pair of end coils located in said recesses in the inner surface of said retainer legs and a middle portion for engaging one end of said brush for resiliently urging said brush against the commutator of said dynamo electric machine with a constant force;

said container having two internal longitudinally extending slots for receiving and positioning said retainer and said brush; and a removable cap positioned in a radially outer end of said container for keeping said retainer, spring and brush within said container during operation of said machine.

2. The assembly of claim 1 in which said longitudinally extending slots in the container are spaced 90° apart.

3. The assembly of claim 1 in which said cap is screwed into a top of said container.

4. The assembly of claim 1 in which the distance between outside of said coils in said spring relaxed position is greater than a distance between said retainer legs.

5. The assembly of claim 1 in which said container has an additional longitudinal slot intermediate the slots for positioning said U-shaped retainer for receiving an electrical shunt connected to said brush.

* * * * *